July 9, 1929.   H. C. ELKINS   1,720,321
GAS GENERATING APPARATUS
Filed April 23, 1927
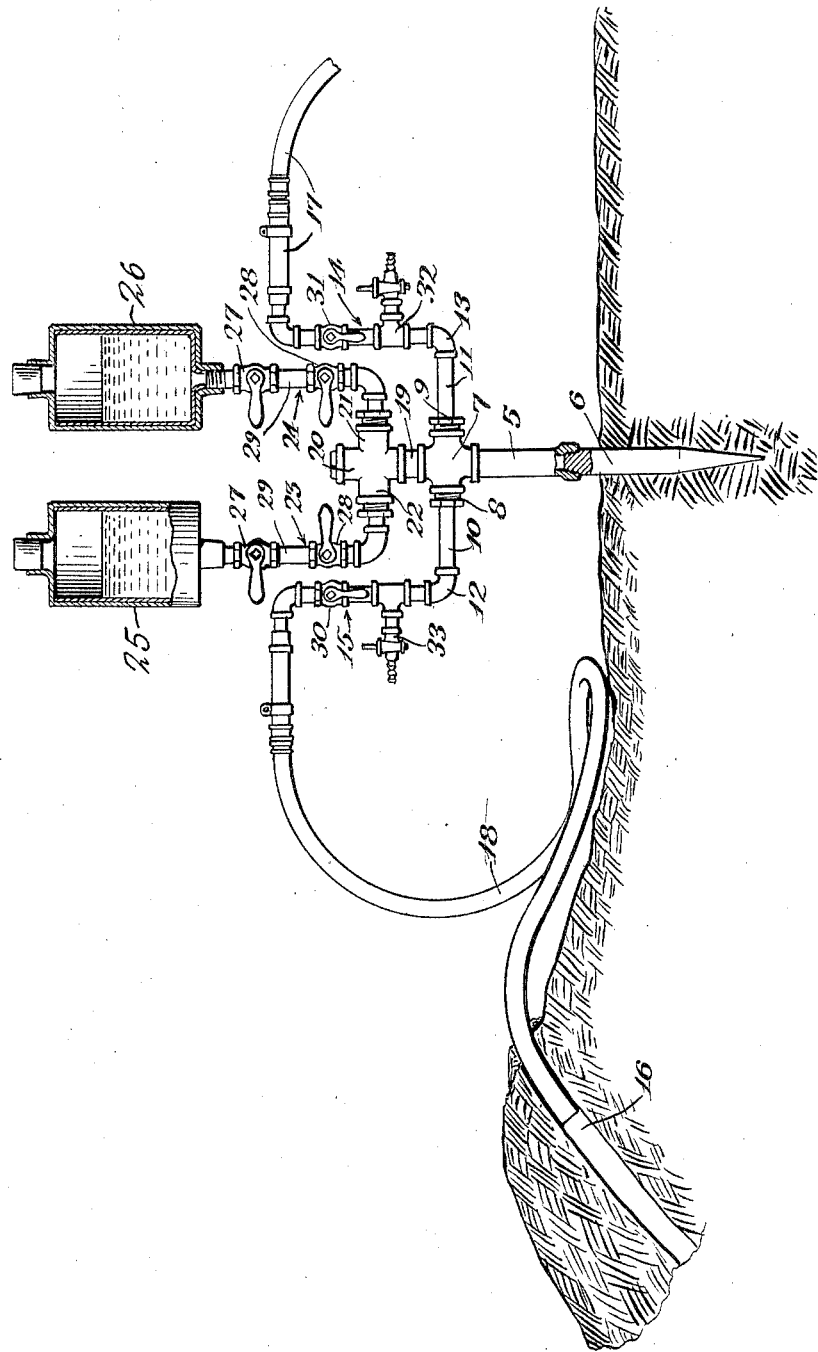
Inventor
Harry C. Elkins
Attorney Patented July 9, 1929.

1,720,321

UNITED STATES PATENT OFFICE.

HARRY C. ELKINS, OF HIGHLANDS, CALIFORNIA.

GAS-GENERATING APPARATUS.

Application filed April 23, 1927. Serial No. 186,004.

My invention relates more specifically to a portable apparatus for generating a volume of poisonous gases for use in connection with the destruction of rodents.

A chief object is to provide a simple portable valve controlled apparatus that will quickly generate poisonous gases and direct the same under pressure into the burrows of rodents for exterminating the same.

Another object is to provide an apparatus that may be conveniently connected to the exhaust of a motor vehicle for forcing the generated gases into the animal burrows, or which may be quickly connected to a manually operated air pressure pump when a motor-vehicle is not available.

Briefly, the invention consists of a plurality of pipe lines controlled by valves, having a pair of containers attached thereto for the chemicals utilized for generating the poisonous gases. Provision is made for connecting the pipe lines of the apparatus to the exhaust of a motor vehicle for forcing the generated gases into the burrows of the animals whose extermination is desired. The valve system is so arranged that the generated gases may be forced from the apparatus into the animal burrows by manually operated means when a motor vehicle is unavailable.

The above objects are accomplished by means of the apparatus described herein and illustrated in the accompanying drawing, in which:

The figure of the drawing represents a side elevation of the apparatus with the chemical containers in section, showing the apparatus erected adjacent a rodent's burrow.

In the drawings the apparatus preferably consists of a pipe standard 5 having connected to its lower end a spike member 6 for maintaining the apparatus in an upright position during its operation. Connected to the upper end of the standard is a cross pipe fitting 7 from whose lateral outlets 8, 9, extend outlet pipes 10, 11, each provided on their outer ends with L fittings 12, 13. Extending from each of fittings 12, 13 are pipe lines 14, 15, line 14 constituting a compressed air line, while line 15 is a gas outlet line from whence the poisonous gases are pumped into burrow 16 of the rodents.

The inlet of the air line 14 is threaded for the reception of a flexible hose 17 which may be connected to a suitable source of pressure such as the exhaust pipe of an auto vehicle (not shown). Gas outlet line 15 is exactly similar to the air line and to its outlet end is connected a flexible hose 18 designed to be inserted into the entrance of the animal burrow 16 as shown.

Connected to the upper vertically disposed outlet of the cross fitting 7 by a nipple 19 is another cross fitting 20 from whose lateral outlets 21, 22, pipe lines 23, 24 extend in a vertical direction having secured to their upper ends cylindrical metal chemical containers 25, 26. These containers are glass lined to prevent destructive action of the chemicals on the metal, and their upper ends are provided with filling ports closed with suitable stoppers.

Pipe lines 23, 24, leading from the containers are each provided with a pair of manually operated valves 27, 28, located one above another and spaced apart by measuring nipples 29. Valves 27 control the flow of chemicals from the containers to the measuring nipples, while valves 28 control the flow of measured chemicals from the nipples to the pipe line 5 therebelow where the gas is formed by the admixture of the chemicals.

Pipe lines 14, and 15, are provided with valves 30, 31; valve 30 controlling the gas outlet to the flexible hose 18 while valve 31 controls the air pressure inlet from the exhaust of the motor vehicle.

In case a motor vehicle is not available for forcing the generated gases from the apparatus into the animal run-ways, each of lines 14, 15 is provided with valves 32, 33 disposed directly below valves 30, 31. Valve 32 is connected to a manually operated pneumatic air pump (not shown) of the type usually employed in connection with the inflation of pneumatic vehicle tires, and valve 33 is connected by a hose (not shown) to the animal burrow.

The operation of the apparatus is a comparatively simple matter. When a motor vehicle is available the apparatus after it is erected adjacent the animal burrow and the flexible hose 18 is inserted in the mouth or entrance to the burrow and the earth is banked around the hose to completely seal the entrance. Hose 17 is then connected to the vehicle exhaust and all the valves are closed. Valves 27 from the chemical containers are then opened to fill the measuring nipples 29 with the required quantity of chemicals, after which the valves 27 are closed and valves 28 are opened to permit of an admixture of the chemicals in the formation of the poisonous gases. I have found that a hydrocyanic gas (HCN) is extremely effective in the destruction of animal pests, the containers being supplied with a sulphuric acid and a solution of cyanide for the generation of the gas. The engine of the motor vehicle is then started and valves 28 are closed and valves 30, 31 are opened the force of the exhaust forcing the generated gases in the burrows.

Should a hand air pressure pump be employed the same procedure is followed relative to the various valves with the exception that valves 30, 31 are now closed and valves 32, 33 are opened.

As the apparatus is of light weight it may be readily transported by an operator from place to place, and by reason of the convenient arrangement of valves gases can be readily generated from time to time as occasion demands and easily forced into the animal burrows, the gases being of such a deadly nature that only slight volumes are necessary to completely destroy the animal pests.

What I claim is:

1. A device of the class described comprising a plurality of liquid chemical containers, a valve controlled pipe line, a valve controlled pipe line leading from each container to the first named line, means on each of said container pipe lines for measuring a predetermined quantity of fluid chemicals before delivery to said first named pipe line, one end of said pipe line adapted to be connected to a source of fluid pressure and the other end constituting a gas outlet.

2. A device of the class described comprising a suitable supporting member, a rigid pipe line connected to the upper end of said support, valves to control the inlet and outlet of said pipe line, flexible pipe lines connected to the inlet and outlet of said rigid pipe line, the inlet line adapted to be connected to a source of pressure and the outlet line constituting a gas discharge, a pair of chemical containers connected by pipe lines to the rigid pipe line intermediate its ends, and a pair of valves located in each of the pipe lines leading from the container, whereby a predetermined quantity of chemicals from the container may be measured before admission to the rigid pipe line.

In witness that I claim the foregoing I have hereunto subscribed my name this 7th day of April, 1927.

HARRY CHARLES ELKINS.